July 25, 1950  D. O. BRANT  2,516,102
MILK STRAINER

Filed Aug. 13, 1946  2 Sheets-Sheet 1

DAVID O. BRANT,
INVENTOR.

BY
ATTORNEY

July 25, 1950     D. O. BRANT     2,516,102
MILK STRAINER
Filed Aug. 13, 1946     2 Sheets-Sheet 2
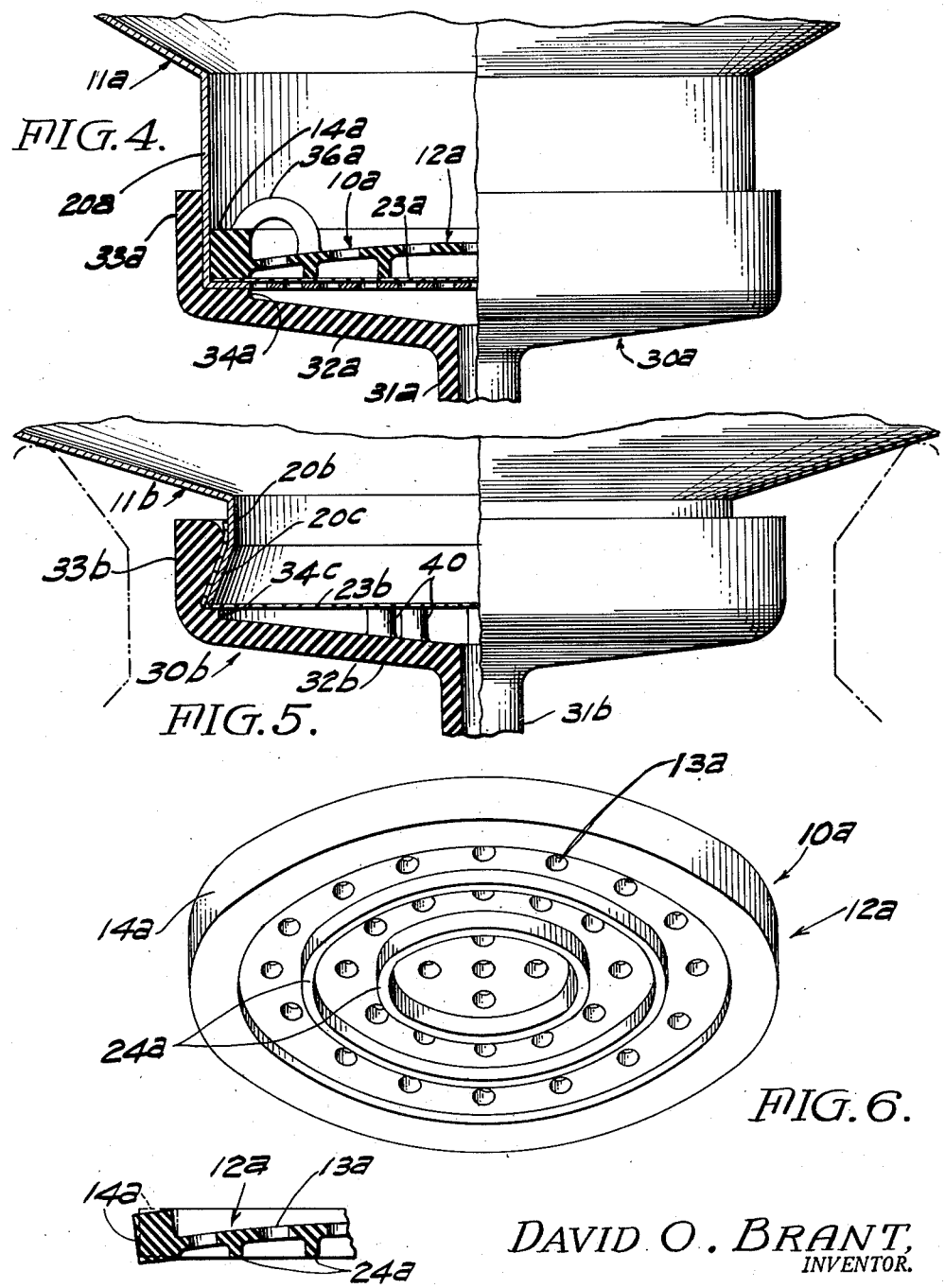
DAVID O. BRANT,
INVENTOR.
BY
ATTORNEY

Patented July 25, 1950

2,516,102

UNITED STATES PATENT OFFICE 2,516,102

MILK STRAINER

David O. Brant, Beverly Hills, Calif.

Application August 13, 1946, Serial No. 690,186

2 Claims. (Cl. 210—158)

This invention relates to a milk strainer structure.

Speaking more specifically, the invention pertains to a flexible, elastic disk which is insertable into milk strainer structures to hold in place in a more efficient manner the strainer cloth or strainer pad customarily used in such strainers; and to a flow regulating outlet means.

This invention is an improvement in certain particulars upon the strainer structure described and claimed in my application for patent on milk strainers, filed in the United States Patent Office July 16, 1946, Serial No. 683,917, now Patent No. 2,483,000.

It is well known that, in milk strainers now on the market it is well nigh impossible to get a tight, leak-proof fit of the strainer pad in relation to the strainer bowl and the dome which presses the pad into the well of the bowl; and as a result of improperly fitted domes more or less milk by-passes the strainer pad and goes into the main supply unstrained carrying its quota of sediment and dirt.

Manufacturers of strainers acknowledge that it has heretofore been a mechanical impossibility to get and maintain a perfect fit, and realize that, even though they should succeed in doing so the fitted together parts are subject to being warped out of perfect fit by the heat of the tinning process and of soldering or welding the handle to the dome or, granting that perfectly fitting together parts remain after these manufacturing processes, such parts are subject to becoming soon bent out of shape, and impaired as to their fitted together relation by the rough handling that the dairy equipment is subjected to in the usual dairy operations. Hence with the present equipment it is seldom that perfectly fitting together strainer parts are produced, and perfect straining is consequently equally rare. The above mentioned defects in strainer structures now on the market are due to a considerable extent to the fact that the metal domes of the strainers are rigid and inflexible and seldom match up with the bowls of the strainers so as to make a leak-proof condition at their joints.

It is the purpose of the present invention to overcome the above mentioned defects by providing a dome made of rubber, plastic or other suitable somewhat flexible material which can be molded at a low cost to the exact shape and size of the well or cavity into which the strainer pad is to be pressed and sealed; in combination with a properly constructed elastic strainer outlet member.

Another object of the invention is to provide, as a new article of manufacture, for different types of strainer bowls now on the market an improved elastic outlet spout attachment which will conform, in a fluidtight manner to the bottoms of such bowls when attached to them, and which may be efficiently applied to such bowls even when they vary considerably in size and contour.

Another object of the invention is to provide in a milk strainer structure, an elastic dome shaped member which, on account of its flexibility can be rolled into and out of its operative position, with the strainer disk adhering to it, so that the disk can be inspected for breaks and imperfections before it is removed from the underside of the dome.

Still another object is to provide an elastic strainer cloth-holding insert which, even when the strainer bowl is bent somewhat out of shape due to irregularities in construction or to rough usage, will nevertheless conform itself to the shape of the bowl, thus preventing leaks or by-passing of the milk.

Yet another object is to provide, as a new article of manufacture, an elastic rust-proof, strainer cloth holding insert disk, removably insertable into the outlet portion of the bowl of a milk strainer, said insert disk having a concavo-convex body portion which adds to the range of the diametrical adjustability of said insert disk.

Other objects, advantages and features of invention will hereinafter appear.

Referring to the accompanying drawings which illustrate present preferred embodiments of the invention:

Fig. 4 is a side elevation and a part midsection of a modified form of the device.

Fig. 5 is a fragmentary side elevation and part midsectional view of another modification, showing the invention applied to a conventional strainer, the upper portion of a supporting milk can being shown in broken lines.

Fig. 6 is a bottom perspective view of the dished fabric-holding insert shown in Fig. 4.

Fig. 7 is a fragmentary sectional view of a portion of the insert shown in Figs. 4 and 6, full lines indicating the normal, unstressed condition of the insert before positioning it within the strainer, and dotted lines showing its operative position.

Figure 1:
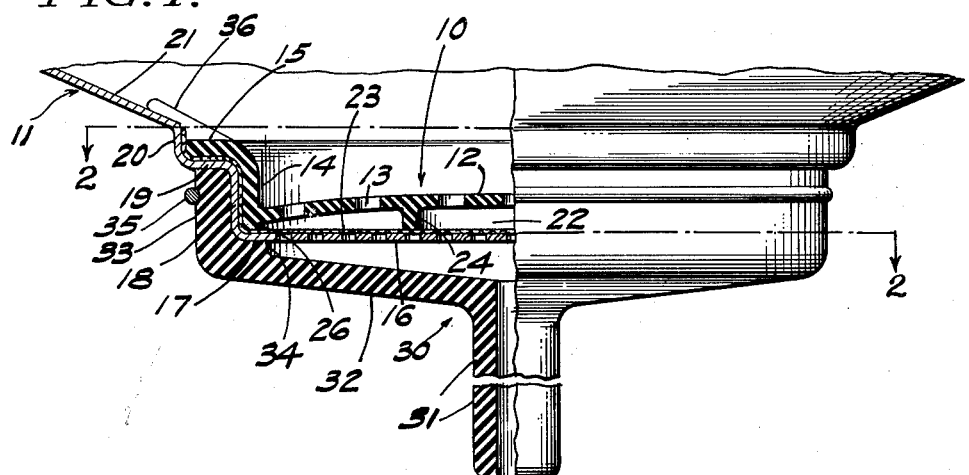
Fig. 1 is a fragmentary side elevation and partial midsection of the complete device.
Figure 2:
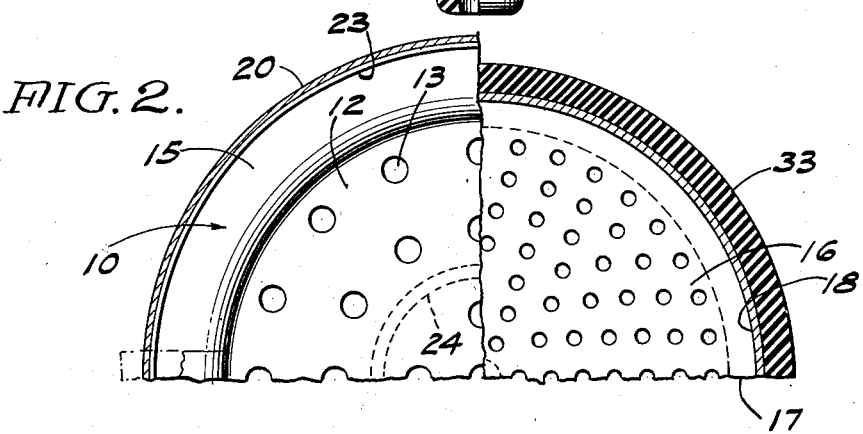
Fig. 2 is a fragmentary horizontal section on angular line 2—2 of Fig. 1.
Figure 3:
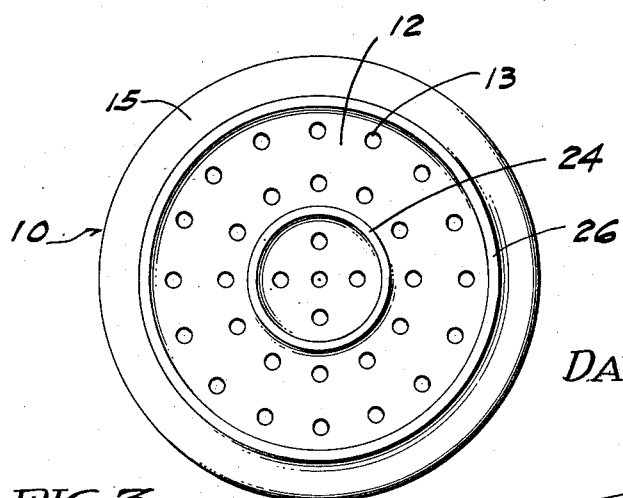
Fig. 3 is a bottom plan view on a reduced scale of the dished, fabric-holding insert disk, shown in part in Figs. 1 and 2.

Referring in detail to the drawings, in Figs. 1, 2 and 3 is illustrated one form of my improved concavo-convex, strainer fabric-holding insert disk 10, said disk in Figs. 1 and 2 being shown in its operative position within one type of milk strainer 11, of which the full upper structure is shown in my co-pending application supra, the lower portion thereof being different in my said application.

Said insert, described more in detail, is seen to comprise a slightly concavo-convex, circular body portion 12 having through it a multiplicity of circular milk-admission passages 13. As seen in Fig. 1, this disk body 12 has an upwardly directed peripheral flange 14 which is outwardy stepped so as to furnish it with a horizontal edge portion 15.

The strainer body 11 is pressed out of sheet metal, being shaped with a foraminated horizontal bottom 16 having an imperforate peripheral portion 17, an annular lower wall portion 18 upstanding from the outer edge of said part 17, an outwardly directed horizontal ledge 19 thereabove surrounded by an upper annular vertical wall 20 underlying the flared strainer mouth portion 21.

Returning to the insert disk 10, when said disk is in its operative position its convex side is directed upwardly, thus leaving a clearance 22 between it and the horizontal strainer cloth 23 which overlies the foraminated strainer bottom 16. In order to maintain this clearance and at the same time hold in place said strainer cloth the disk bottom 12 is provided with downward projections, shown as one or more concentric ribs 24, the widths of said ribs being such as substantially to compensate for the amount of clearance 22 between said disk and cloth resulting from the concave face of the disk being directed downwardly, the width of said clearance being slightly increased by reason of the disk body 12 having a short, downwardly directed peripheral bead 26. The reason for supporting the disk body 12 in the manner stated is to prevent the retarded outflow through the hereinafter described spout member from causing the strainer cloth from floating up against the superjacent part of the strainer structure, which would retard the flow of milk through the cloth. The upper surface of said disk strainer cloth is engaged both by said rib or ribs and said bead 26, the cloth being a disk of sufficiently greater diameter to allow its peripheral portion to be interposed between the flange portion 15 of the insert member and the ledge 19 and wall portion 20 of the strainer. The weight of the milk upon said flange portion 13 causes it to press in a more efficient manner upon the part of the strainer cloth underlying it.

In Fig. 1 the strainer is shown provided with a detachable, elastic milk-delivery member 30 consisting of a central, downwardly directed spout 31, a slightly dished floor portion 32 and a peripheral, circular applicator portion 33, the latter portion having an internal, annular, flat-topped, basal ledge 34 underlying the imperforate outer part 17 of the strainer bottom.

In the structure of milk delivery member 31 just described the strainer-gripping lip 33 is rather short, hence an elastic clamping ring 35 is provided for application therearound to guard against its unwanted detachment. In this instance the insert is provided at one side of its periphery with an ear 36 which the operator may pull upon to remove the insert.

In the structure shown in Fig. 4 the milk-delivery member 30a is shown having a longer applicator lip 33a which needs no elastic cord to keep it in place, the strainer 11a having a longer cylindrical part 20a which provides plenty of room for said lip 33a. Also in this view an arcuate finger-hold loop 36a is provided upon the periphery of the insert member 10a for use in removing the latter. The annular ledge 34a of Fig. 4 is wider than the ledge 34 of Fig. 1.

As more clearly illustrated in Fig. 7, the insert disk 12a of Fig. 4 has a thickened, upwardly directed peripheral portion 14a the outer face of which is inclined outwardly from the vertical when the disk as a whole is disposed horizontally with its convexity directed upwardly. When, however, said disk is forced into its operative position within the bowl of the strainer said thickened peripheral portion thereof is deflected to the dotted line position of Fig. 7. Constructing the disk thus adds to the pressure with which the periphery of the disk engages the interior of the side wall of the strainer causing it to seat more firmly upon the marginal portion of the strainer cloth 23a.

The remaining parts of the structure shown in Fig. 4 are substantially the same as in Fig. 1 and hence are lettered the same.

In Fig. 6 the modified disk 12a is shown having a plurality of concentric ribs 24a which function similarly to the rib or ribs 24 of Fig. 1. Said ribs also prevent reverse arcuating of the disk's dome.

In Fig. 5 the strainer 11b has a cylindrical part 20b with an outwardly flared lower portion 20c which is externally gripped by the thickened undercut lip or peripheral wall 33b of the modified spout-carrying member 30b, the marginal portion of the strainer cloth 23b surrounding said flared part 20c and being gripped between it and the undercut lip 33b. The flared part 20c of the strainer is frusto-conically shaped to conform to the undercut, which is also frusto-conical. In this structure the spout-carrying member is furnished with a plurality of integral upstanding fingers 40 positioned to support the strainer cloth 23b so as to maintain an outflow clearance thereunder. These fingers are required because in this embodiment the foraminated bottom is absent from the strainer 11b.

It will be observed that not only the strainer bowl shown in Fig. 5 has a vertically extending peripheral wall portion 20b which is externally gripped by the spout member, but the spout member also grips vertical wall portions of the bowls shown in Figs. 1 and 4.

The combination of the elastic spout-carrying member with the strainer domes shown produces superior results. It will be observed that in all the strainer structures illustrated in the drawings the strainer cloth is not permitted to float up against the under side of any imperforate, flat surface, which would cause the part of pad contacting with such a surface not to function properly.

The entire strainer structure shown can be easily and efficiently washed and sterilized.

The elastic insert member can be made at a low cost of heat and fat resistant material, such as "neoprene," or some plastic, not only producing a simpler and less expensive article to make and maintain, but one that will outwear a metal insert.

The strainer cloth-gripping parts of the strainer structures shown are free from sharp, inflexible edges that would tend to cut thin strainer disks of filter paper or cotton, hence by this invention it is made possible to use these cheaper, more economical and more efficient disks.

Owing to the upward convexity of the body portion of each of the elastic insert members shown in Figs. 1 and 4 a greater range of adjustability results between them and the strainer bowls into which they are fittable, because the convexity of said members augments their elastic property in regard to radially outward pressure exerted by them in their inserted positions.

I claim:

1. In a milk strainer, a bowl having a perforated bottom plate and a cylindrical wall rising from the periphery of said plate, a filter disk covering said plate, a resiliently flexible member of pliant rubber for retaining said filter disk on said plate, said retaining member having a circular apertured body and a solid annular marginal portion resiliently pressed against the cylindrical wall and upon the peripheral margin of the filter disk, and means integral with and depending from the center part of the body of the retaining member disposed to engage the filter disk in a region spaced substantially inward of its pressed margin to space the body of the retaining member from the filter.

2. In a milk strainer, a bowl having a perforated bottom plate with a cylindrical wall rising from the periphery of the plate and an outwardly directed shoulder at the top of said wall, a filter disk covering said plate and having its marginal portion seated against the cylindrical wall and upon the shoulder of the bowl, a resiliently flexible disk of pliant rubber for retaining the filter disk in position, said retaining disk having an apertured body and an annular marginal portion for resiliently pressing the filter margin against the peripheral margin of the plate, the cylindrical wall and the shoulder of the bowl, and a concentric rib integral with and depending from the body of said retaining disk adjacent its center to bear upon the filter disk substantially inward of the periphery of the plate to support the body of said retaining disk spaced from the filter.

DAVID O. BRANT.

REFERENCES CITED

The following references are of record in the file of this patent:

UNITED STATES PATENTS

| Number | Name | Date |
|---|---|---|
| 712,336 | Rudner | Oct. 28, 1902 |
| 807,547 | Fliegel | Dec. 19, 1905 |
| 809,115 | Klint | Jan. 2, 1906 |
| 1,014,843 | Nobles | Jan. 16, 1912 |
| 1,501,073 | Stead | July 15, 1924 |
| 1,647,562 | Drew | Nov. 1, 1927 |
| 1,958,701 | Hois | May 15, 1934 |
| 2,098,128 | Bailey | Nov. 2, 1937 |
| 2,209,447 | Dowling | July 30, 1940 |
| 2,321,220 | Lieberman | Jan. 8, 1943 |
| 2,331,234 | Rush | Oct. 5, 1943 |